A. SMITH.
ADDING MACHINE.
APPLICATION FILED FEB. 11, 1915.

1,184,390.

Patented May 23, 1916.
10 SHEETS—SHEET 1.

Witnesses

Inventor.

A. SMITH.
ADDING MACHINE.
APPLICATION FILED FEB. 11, 1915.

1,184,390.

Patented May 23, 1916.
10 SHEETS—SHEET 3.

Fig 3

Witnesses
E. E. Myers
Jos. McCormack

Inventor
Abraham Smith
By J. C. Armstrong
attys

A. SMITH.
ADDING MACHINE.
APPLICATION FILED FEB. 11, 1915.

1,184,390.

Patented May 23, 1916.
10 SHEETS—SHEET 7.

Witnesses
E. E. Myers
Jos. McCormack

Inventor.
Abraham Smith

UNITED STATES PATENT OFFICE.

ABRAHAM SMITH, OF ERIE, PENNSYLVANIA.

ADDING-MACHINE.

1,184,390.  Specification of Letters Patent.  Patented May 23, 1916.

Application filed February 11, 1915. Serial No. 7,464.

*To all whom it may concern:*

Be it known that I, ABRAHAM SMITH, a citizen of the United States, residing at Erie, in the county of Erie and State of Pennsylvania, have invented certain new and useful Improvements in Adding-Machines; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to adding machines, and has for its object the construction of such a machine, in which each of the several accumulators and their associated printing members, together with the operating mechanism therefor is mounted upon a common shaft, in vertical longitudinal alinement with columns of finger operated keys in which the adding operation of each of said accumulators and its associated mechanism is controlled, and the arrangement of suitable press-roll mechanism adapted to coact with the several printing members to print the items, and roll shifting mechanism by means of which the totals of the added items may be printed by said printing members.

The mechanism which I employ to embody the several features of my invention is hereinafter pointed out and explained, and is illustrated in the accompanying drawings, viz:—

Figures 8, 9:
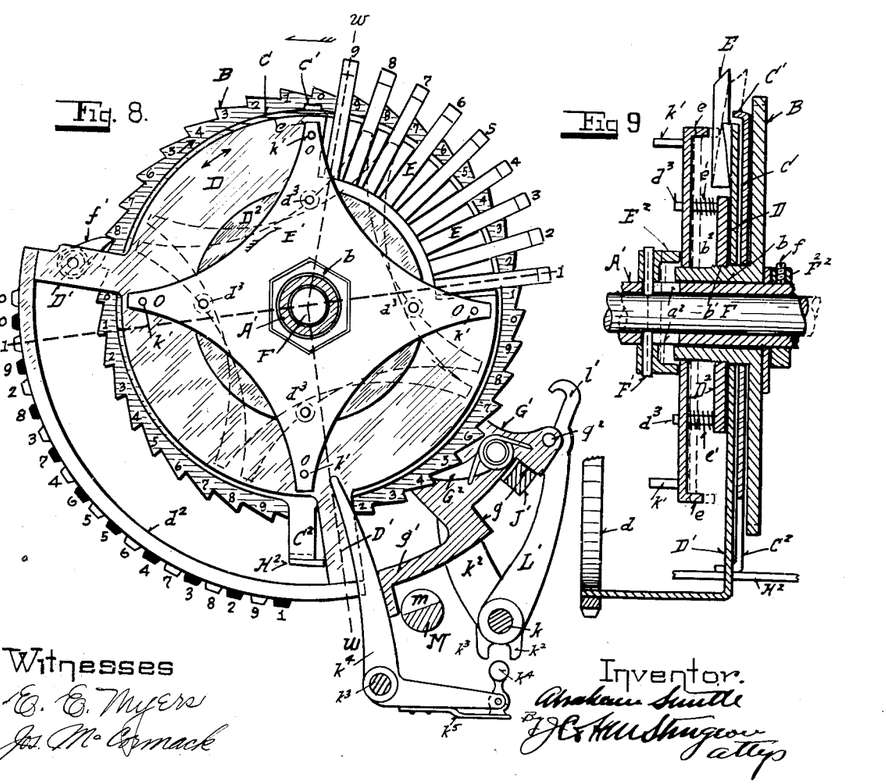
Fig. 8, is a left hand end elevation of a portion of the mechanism removed from the case.
Fig. 9, is a vertical section of the same, on the line $w$—$w$, looking in the direction of the arrow in Fig. 8.
Figure 10:
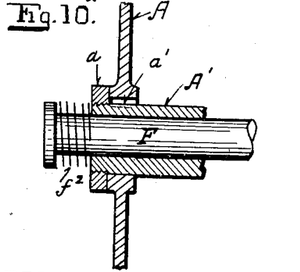
Fig. 10, is a vertical section of a fragment of the left hand end of my machine.
Figure 11:
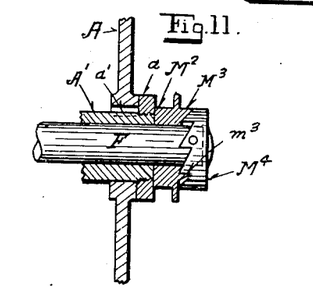
Fig. 11, is a vertical section of a fragment of the right hand end thereof.

In these drawings A—A, indicates the end frames of my improved adding machine. In these end frames I secure a hollow shaft A′, by means of nuts $a$ $a$, and I make the hollow shaft A′, non-rotatable in the end frames A A, by means of keys $a'$ $a'$, or otherwise, as may be preferred, as shown in Figs. 10 and 11. This hollow shaft A′, is provided with slots $a^2$, as shown in Fig. 9. Rotatably mounted upon the hollow shaft A′, are a series of ratchet wheels or accumulators, B, B′, B²; the number being increased for additional figures. These ratchet wheels are provided with hubs $b$, (see Fig. 9) upon a portion of which screw threads $b'$, are cut, and that portion of the hub $b$, outside of the threads $b'$, being given a hexagonal form as at $b^2$, (see Figs. 8 and 9) for the purpose hereinafter set forth.

Upon the hubs $b$, I pivot a disk C, having arms C′, and C², thereon, the end of the arm C′, being turned over laterally away from the ratchet wheels B. I next pivot upon the hubs $b$, of the ratchet wheels B, another disk D, having arms D′, extending radially therefrom, which arms D′, support type bearing segments $d$, $d'$, $d^2$, (see Figs. 3, 4, 6, 8 and 9). To maintain the disks and ratchet wheel, D, C, and B, in close proximity, I place a nut-disk D², (see Figs. 8 and 9) upon the screw threads $b'$, on the hub $b$, the nut-disks D², being provided near their peripheries with laterally extending stud-pins $d^3$, for the purpose hereinafter set forth.

Figure 2:
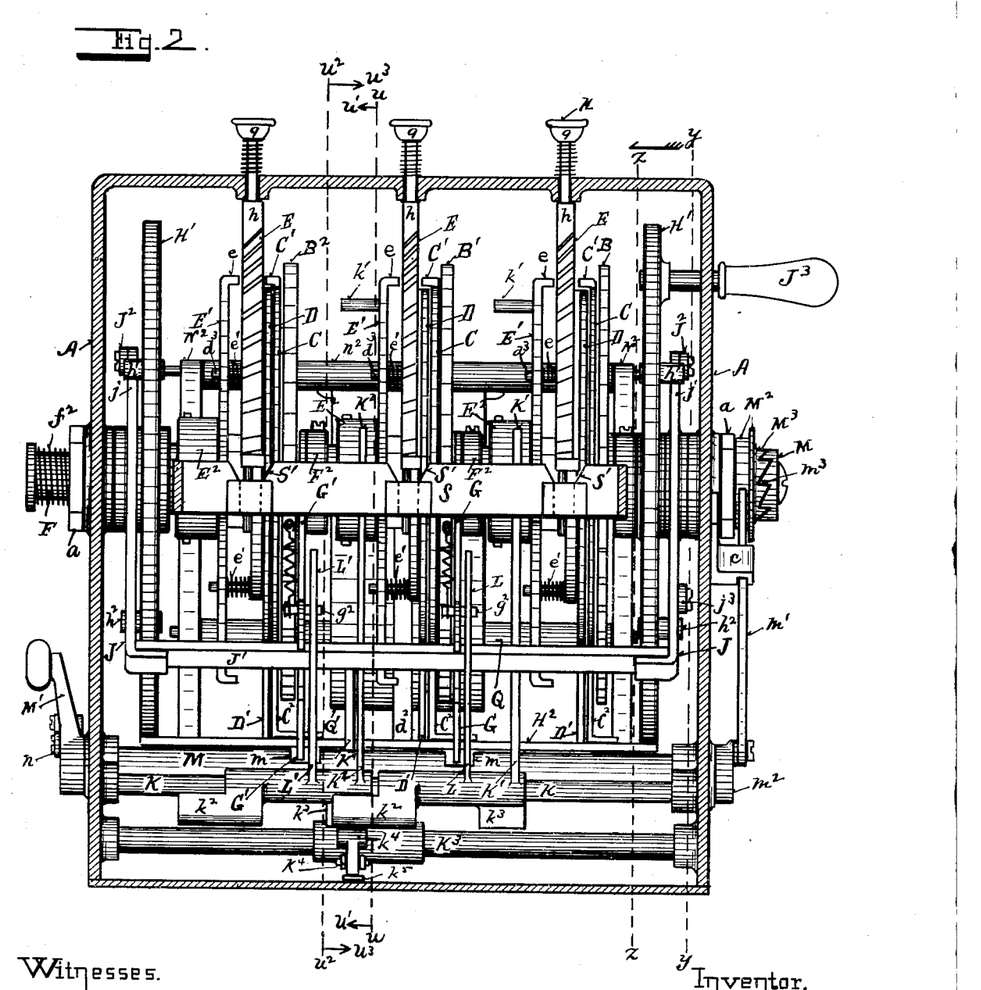
Fig. 2, is a front sectional view of the same, on the line $x$—$x$ in Fig. 1.
Figure 4:
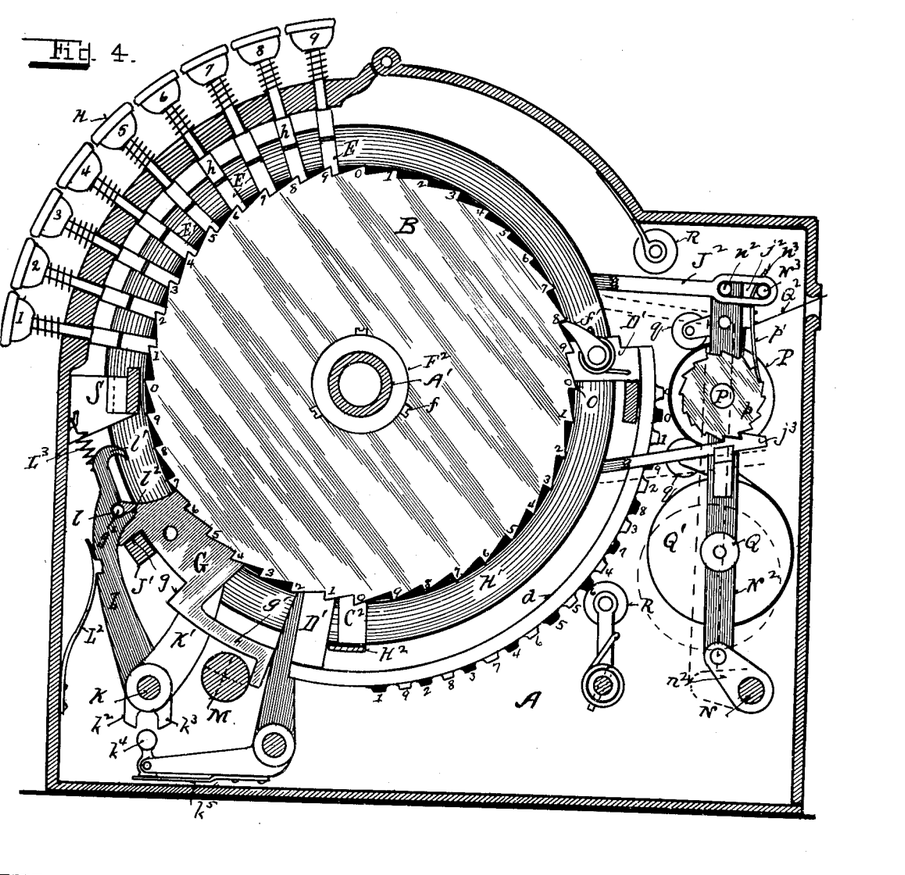
Fig. 4, is a vertical section on the line $z$—$z$, in Fig. 2, looking in the direction of the arrow.
Figure 5:
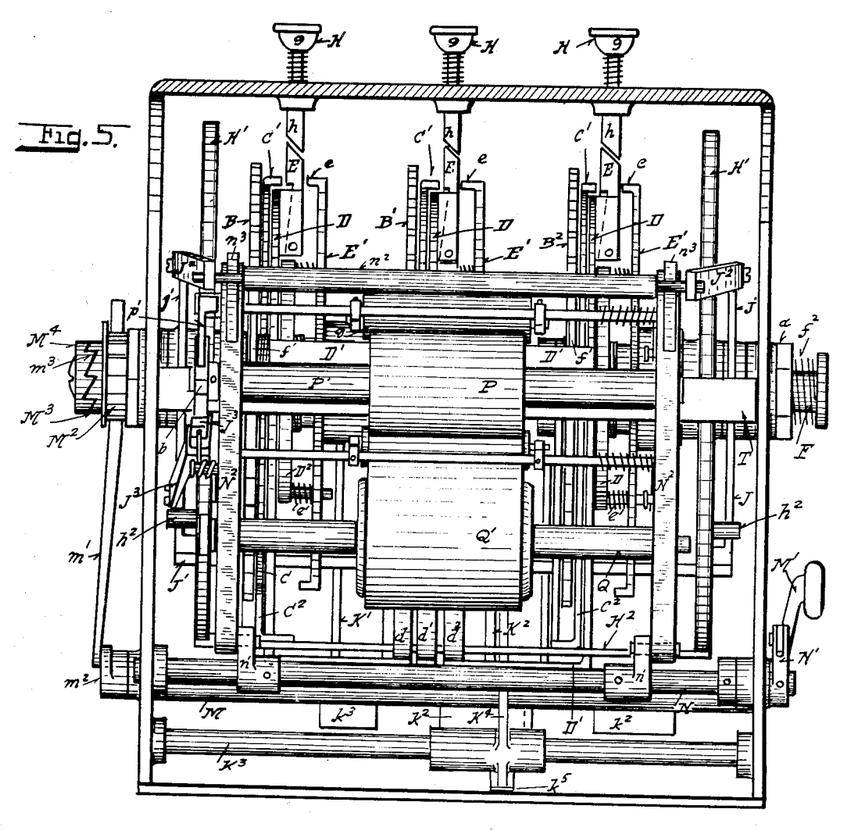
Fig. 5, is a rear view in elevation of the same, with the cover removed.
Figure 6:
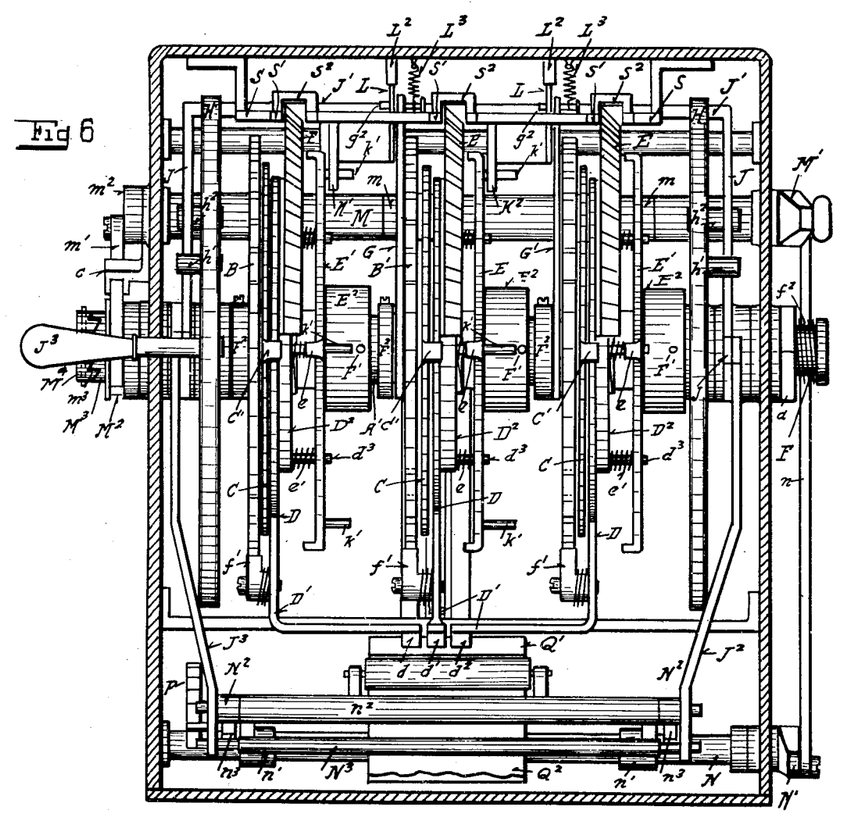
Fig. 6, is a horizontal section of the case, showing a plan view of the mechanism.

Upon the side of the disk D, are hinged nine (9) radially projecting arms E, the outer ends of which are preferably beveled, as shown in Figs. 2, 5 and 9. The sides of the arms E, next to the disk D are cut away to permit a portion of said arms to extend over the periphery of the disk D, when said arms are moved laterally as shown by broken lines in Fig. 9. The ratchet wheels B, are provided with teeth, said teeth being in multiples of ten, the ratchet wheels shown in the drawings having forty (40) teeth each. In Figs. 4 and 8, I have numbered the teeth on the ratchet wheels, according to the figures they represent, from one to nine, every tenth tooth representing ten or zero.

Figure 16:
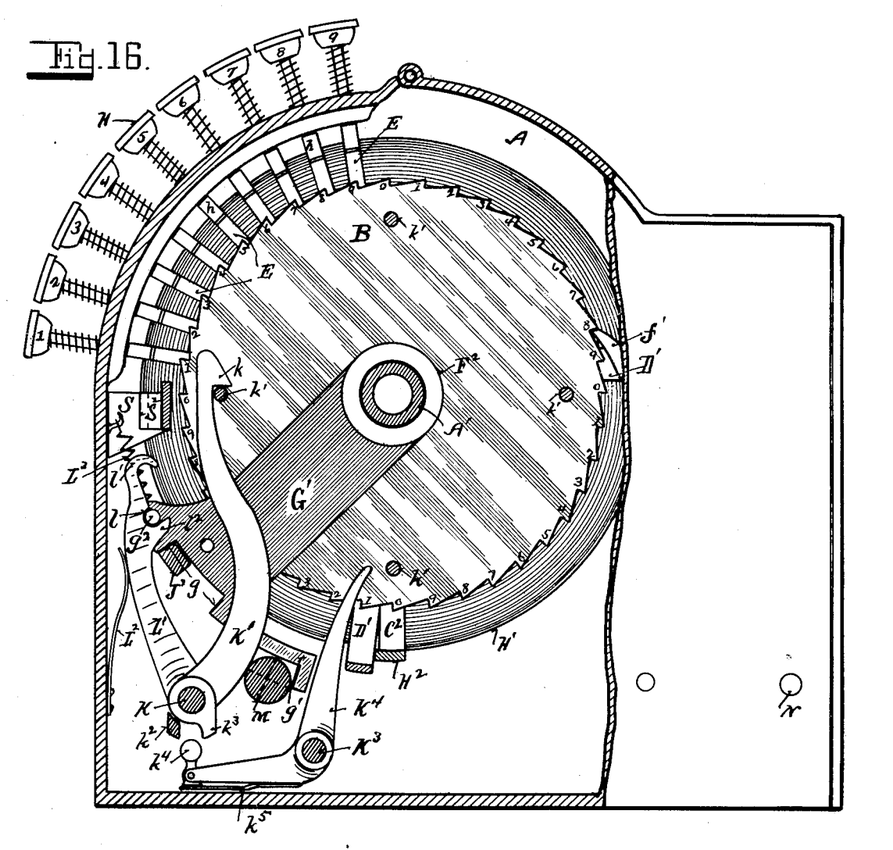
Fig. 16, is a view partly in side elevation and partly in section on the line $u$—$u$ in Fig. 2; looking in the direction of the arrow $u'$.
Figure 17:
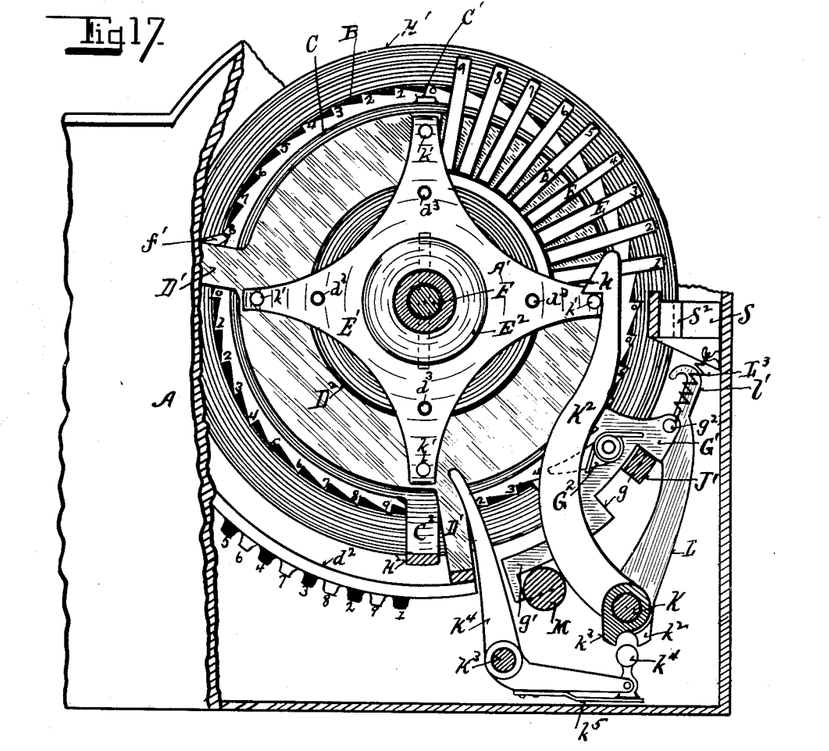
Fig. 17, is a view partly in side elevation and partly in section on the line $u^2$—$u^2$, in Fig. 2, looking in the direction of the arrow $u^3$.

Upon the hexagonal portion $b^2$, of the hubs $b$, I place a disk or plate E', (see Figs. 8 and 17) which revolves in unison with the ratchet wheel B, said plate E', being provided with openings to receive the stud-pins $d^3$, on the nut-disk $D^2$, and with laterally extending points $e\ e\ e\ e$, each of which is directly opposite a tooth on the ratchet wheel, representing zero, so that as said ratchet wheels revolve, the plate E, and its points $e$, revolve in unison therewith. Upon the stud-pins $d^3$, between the plate E', and nut-disk $D^2$, are springs $e'$, (see Fig. 9) for the purpose of normally maintaining said plate E', away from the nut-disk $D^2$. Upon the hollow shaft A', I place a suitable flanged collar $E^2$, (see Figs. 9 and 17) and within the hollow shaft I place a slidable rod F. A pin F', is then passed transversely through the flanged collar $E^2$, and rod F, passing through the slots $a^2$, in the walls of the hollow shaft A', so that when the rod F, is moved as shown by broken lines in Fig. 9, the plate E', will be moved laterally as shown by broken lines in said figure, so that one of the lateral points $e$, will engage one of the radial arms E, and push it over as shown by broken lines in Fig. 9, so that it will be engaged by the point C', on the disks C, when said disk is rotated. Upon the hollow shaft A', adjacent to the ratchet wheel B, I secure a collar $F^2$, by means of a set screw $f$, to prevent the ratchet wheel B, from moving longitudinally on the hollow shaft A'; but between the ratchet wheels B', and $B^2$, and their collars $F^2$, carrying levers G and G', are pivoted on the hollow shaft A' (see Figs. 6 and 16). In all other respects the construction and arrangement of the ratchet wheels B, B', and $B^2$, and their associated disks C, D, $D^2$, and E', are identical. The carrying levers G and G', are each provided with a spring pressed dog $G^2$, which engages the teeth on the ratchet wheels B', and $B^2$, (see broken lines in Fig. 4, and full lines in Fig. 17). These carrying levers G and G', are also provided with recesses $g$, in their outer ends for the purpose hereinafter set forth. Each of said carrying levers is also provided with hooked arms $g'$, and with a stud-pin $g^2$, for the purpose hereinafter set forth. One of the arms D', on each of the disks D, is also provided with a spring pressed dog $f'$, (see Fig. 4) which engages the teeth on the ratchet wheels B, B', and $B^2$, to move them forward when the disks D, are operated as hereinafter described.

In the front of the case I place spring-pressed keys H, on lines radial with the arms E, the inner ends $h$, of the posts of which are beveled as shown in Fig. 2. The keys H, represent figures from 1 to 9, inclusive, and each is adapted to engage its corresponding arm E, on the disks D, when pressed, and force said arm to swing laterally as shown by broken lines in Fig. 9, so that the same may be engaged by the arm C', on the disk C, as hereinafter described.

Upon the hollow shaft A', I mount disks H' H', which are connected by a bar $H^2$, to which bar the arms $C^2$, $C^2$, $C^2$, on the disks C, are secured, so that the said disks C, will rotate in unison with the disks H'. The disks H', are also provided with stud-pins $h'$, and $h^2$, for the purpose hereinafter set forth.

Upon the hollow shaft A', near each end thereof, I mount arms J J, the ends of which are connected by a cross bar J', which passes or is located in the recesses $g$, in the ends of the carrying levers G and G' (see Figs. 2, 4, 8, 16 and 17) said space being long enough to permit the said levers to move, with relation to said cross-bar, sufficiently to permit the dogs $G^2$, to engage the next backward tooth of the ratchet wheels B' and $B^2$, as hereinafter described.

Secured in the end plates A A, of the machine, is a rod K, upon which is mounted levers K' and $K^2$, which are provided at their upper ends with inclined surfaces $k$, (shown in full lines—see Figs. 2, and 17) adapted to be engaged by stud-pins $k'$, on the plate E', and be forced backward thereby. Secured on the hubs of the levers K', and $K^2$, are latch levers L and L', which are provided with notches $l$, adapted to receive the stud-pins $g^2$, in the carrying levers G and G', which normally maintain the transfer levers G and G', in the position thereof indicated by full lines in said figures and are also provided with hooked extensions $l'$, adapted to limit the movement of said carrying levers when released from said notches $l$. Said levers L and L', are also provided with stops $l^2$, to limit the movement of said carrying levers in the opposite direction.

$L^2$, indicates springs adapted to normally maintain the latch levers L and L', in engagement with the stud-pins $g^2$, in said carrying levers; and $L^3$, indicates springs adapted to operate the carrying levers G and G', when the same are released by the latch levers L and L', as hereinafter described.

The hub of the levers K', and L, is provided with a projection $k^2$, which extends downwardly therefrom and laterally toward and overlaps the hub of the levers $K^2$ and L', and the hub of the levers $K^2$, and L', is also provided with a projection $k^3$, which extends downward therefrom behind the projection $k^3$, on the hub of the levers K', and L, and in spaced relation thereto. (See Figs. 2, 3, 4, 5, 16 and 17.) Mounted upon a transverse rod $K^3$, supported in the end frames A, of the machine, there is a bell-crank lever $K^4$, one arm of which extends upwardly adjacent to the plate E, associated with the accumulator B', and is adapted to be engaged by the stud-pins $k'$, on said plate E, (see Figs. 16 and 17). Pivoted in the other arm of the lever $K^4$, there is an upwardly projecting arm $k^4$, which is adapted to enter and fill the space between the projections $k^2$ and $k^3$, on the hubs of the levers K'—L, and $K^2$—L', so that when the lever $K^4$, is engaged by a stud-pin $k'$, on said plate E', the arm $K^4$, will enter said space and thereby cause the levers $K^2$ and L', to release the transfer lever G', when the levers K' and L, are operated.

The arm $k^4$, is yieldingly maintained in an upright position by a spring $k^5$, which is secured under the lever $K^4$, and presses against a flat surface on the lower end of said arm $k^4$. The operation of this lever $K^4$, therefore, is such that when 99 has been accumulated on the accumulator B and B', and 1, is added on the accumulator B, the transfer lever G', will be released simultaneously with the release of the transfer lever G, so that the operation of the disks H', will cause the accumulator $B^2$, to move forward one notch, these registering 100 on all the accumulators.

Figure 1:
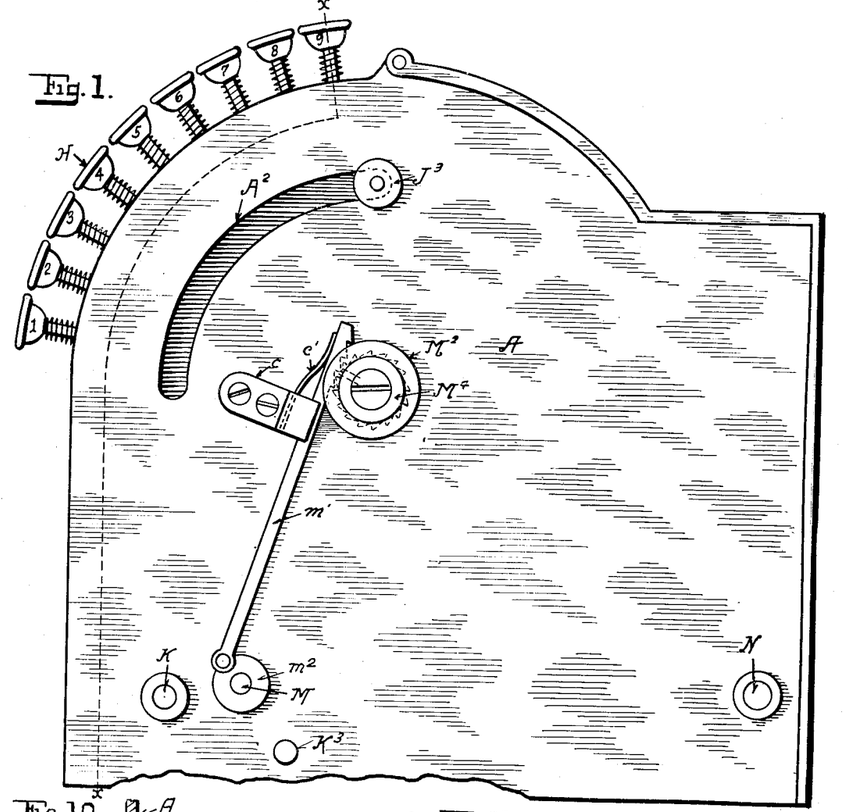
Figure 1, is a right hand end view in elevation, of an adding machine embodying my invention.

M, indicates a rockable shaft provided with transverse slots or recesses $m\ m$, (see Figs. 2 and 3.) through which slots the hooked end of the arm $g'$, on the carrying levers G and G', may pass when the same are released by said latch levers, but which when rocked a quarter turn will prevent said carrying levers from being moved by the springs $L^2$, when a total is to be printed, as in such cases there is no transfer from one accumulator to another, to be made, as hereinbefore described. On the right hand end of the rockshaft M, I provide a lever M', for the purpose of rocking said shaft. Upon rod F, at the right hand end of the machine, (see Figs. 1, 2, 5 and 6) I place a ratchet wheel or sleeve $M^2$, the teeth of which are engaged by a toothed bar $m'$, the opposite end of said bar being pivoted eccentrically upon a hub $m^2$, on the right hand end of the rock shaft M. The ratchet wheel $M^2$, is also provided with annular cam-teeth $M^3$. Non-rotatably secured on the end of the rod F, I secure a collar $M^4$, which is provided with cam-teeth $m^3$, which intermesh with the annular cam-teeth $M^3$, on the ratchet wheel $M^2$, so that when the rock-shaft M, is rocked, the bar $m'$, will cause the ratchet wheel to revolve sufficiently to move the cam-teeth $M^3$, thereon, forward one tooth with relation to the teeth on the collar $M^4$, and in so doing cause the rod F, to slide in the hollow shaft A', and thereby force the plates E', toward the disks D, so that one of the points $e$, thereon will force one of the arms E, over into the position thereof indicated by broken lines in Fig. 9, for the purpose hereinafter set forth. Thus the rotating or rocking of the rod M, for the purpose of locking the transfer levers G and G', prior to printing a total, will, through the rock bar $m'$, and the cam teeth $M^3$, and $m^3$, cause the rod F, in the hollow shaft A', to move longitudinally and through the collar $E^2$, (see Fig. 9) cause the plate E', to push the proper arm E, over, as indicated by broken lines in said figure so that the point C', will engage the same when the disks H', are rotated in the operation of printing said total; all of said plates E', being moved by the rod F, in unison. Upon the left hand end of the rod F, I place a spring $f^2$, to normally maintain said collar $M^4$, in contact with the ratchet wheel $M^2$. To operate the disks H' H', I provide a handle $J^3$, which passes through a slot $A^2$, in the right hand end of the machine. To maintain the ratchet bar $m^2$ in mesh with the teeth on the ratchet wheel $M^2$, with a yielding engagement, I provide a guide bracket $c$, which is secured on the machine frame (see Fig. 1) which carries a spring $c'$, which presses against said bar and permits it to rise out of mesh when the bar is moved upward.

Figures 12, 14, 15:
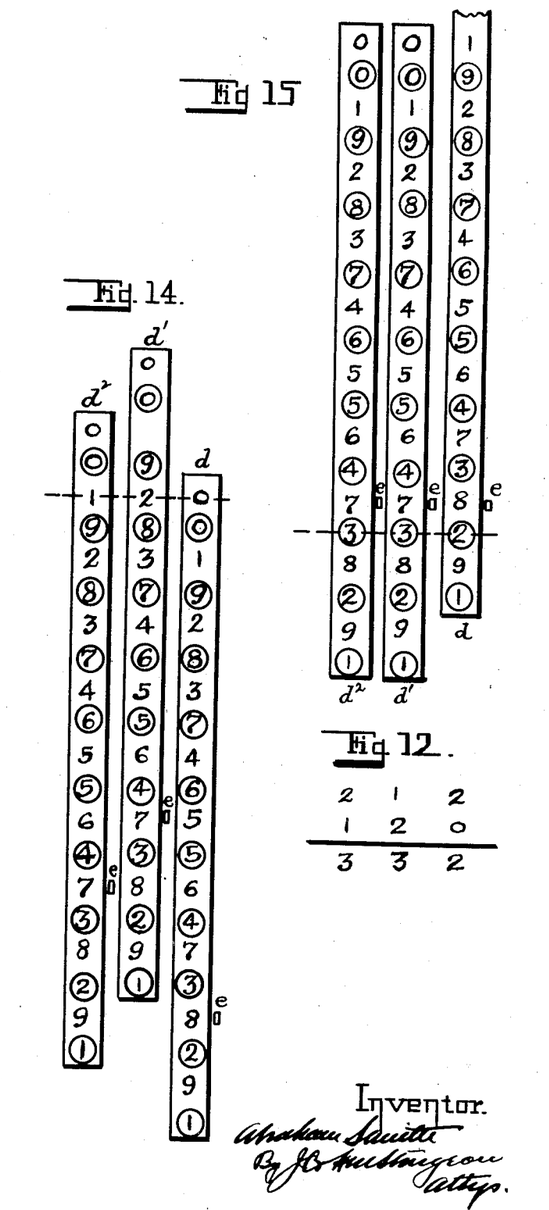
Fig. 12, shows the addition of two numbers.
Fig. 14, is a like view of the same in position to print the second item of addition.
Fig. 15, is a like view of the same in position to print the total of the two items shown in Fig. 12.
Figure 13:
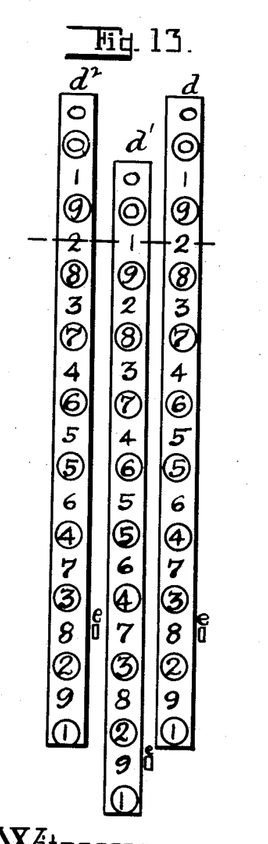
Fig. 13, is a diagrammatic view of the type bearing segments from which the items and totals are printed, in the position thereof when operated to print the first item of the addition.

The type bearing segments $d$, $d'$ and $d^2$, are each provided with two sequences of figures from 0 to 9, inclusive, arranged from top to bottom as shown in Figs. 13, 14 and 15, the figures of one sequence running consecutively from top to bottom of said segments, from which the items added are listed as hereinafter described; and the figures of the other sequences running consecutively from the bottom to the top of the segments, indicated by being inclosed in circles, are alternated with the first sequence and are for the purpose of printing the total sum of any addition performed. In these Figs. 13, 14 and 15, $e$, $e$, $e$, indicate the position of the active point on the plates E', with relation to the hinged arms E, on the disks D, said hinged arms being represented by the item numbers as shown in Figs. 13, 14 and 15, and by the numerals on said hinged arms E.

Figure 3:
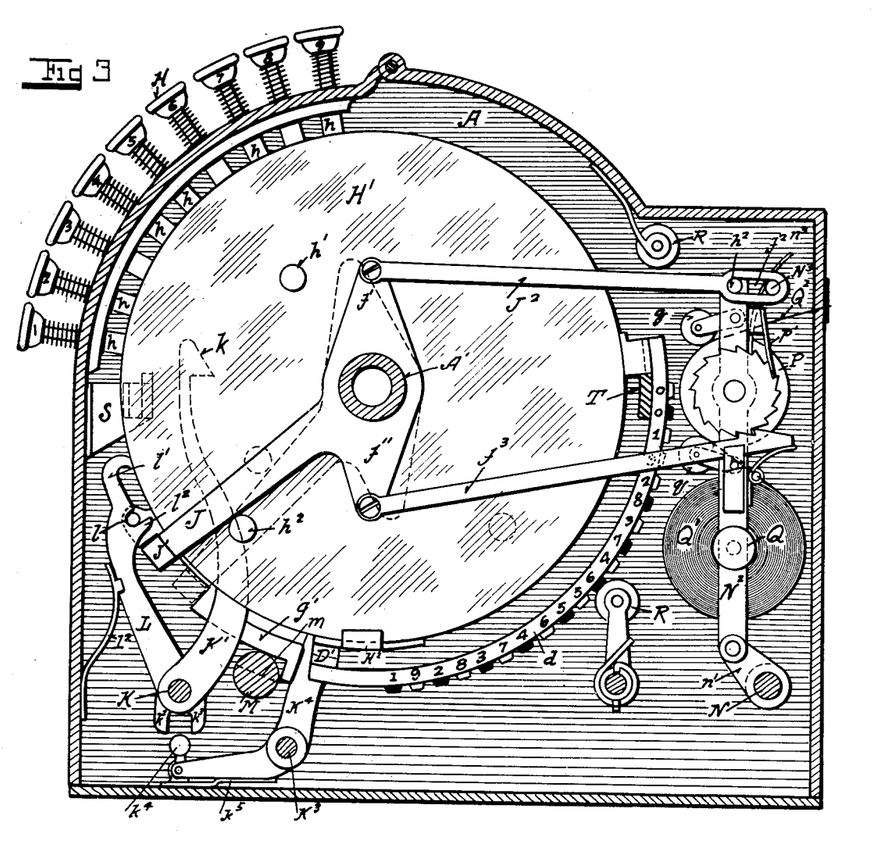
Fig. 3, is a vertical section on the line $y$—$y$, in Fig. 2, looking in the direction of the arrow.

In Figs. 3, 4 and 8, the types shown in solid black on the segments $d$, $d'$, or $d^2$, are, like the numerals in the circles in Figs. 13, 14 and 15, the types from which the totals are printed, as will be more fully explained hereafter.

Figure 7:
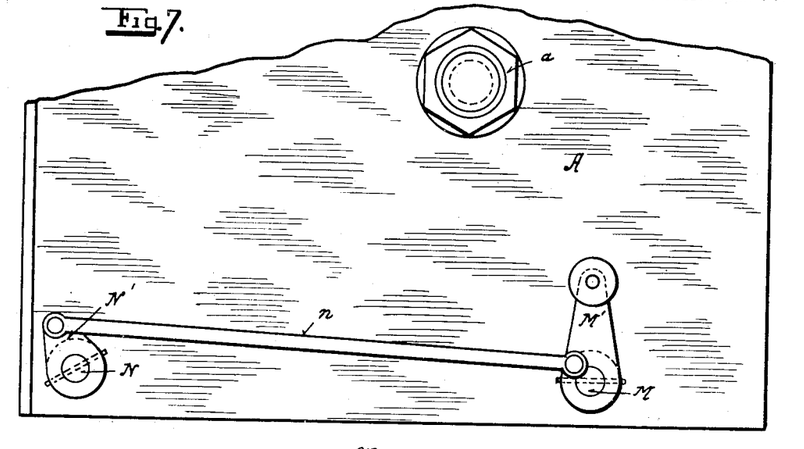
Fig. 7, is a fragment of the left hand end of the machine.

In the rear end of the machine I mount a rock-shaft N, upon one end of which there is a crank lever N', secured, (see Fig. 7) and extending between and pivoted to said crank lever N', and the crank-lever M', on the rock-shaft M, there is a bar $n$, which operates to cause the rock-shaft N, to rock when the rock-shaft M, is rocked, the purpose of which is to lower the impression mechanism hereinafter described, so that the same will coöperate with one of the total printing type, shown in Figs. 3, 4 and 8, as black type, from which type the total will be printed.

Fixed upon the rock-shaft N, there are crank levers $n'$, and pivoted to said crank levers $n'$, are uprights $N^2$, $N^2$. The hubs of the levers J, (see Fig. 3) are provided with lever extensions $j$, and $j'$, and from the lever extension $j$, bars $J^2$, extend to, and are pivoted to the upper ends of the uprights N, by means of studs $n^2$, which operate in slots $j^2$, in the ends of the bars $J^2$. A rod $N^3$, is also placed in said slots $j^2$, which is maintained in the rear ends of said slots by means of springs $n^3$, secured upon the uprights $N^2$. Between the uprights $N^2$, a platen roller P, is mounted upon a suitable shaft P', and upon one end of said shaft a ratchet-wheel $p$, is secured, and a spring dog $p'$, is provided to prevent backward movement of said ratchet wheel $p$, and roller P. Pivoted to the lever extension $j'$, and extending to and engaging the teeth of the ratchet-wheel $p$, is a spring pressed ratchet-bar $j^3$, which operates as hereinafter described.

When the disks H', H', are caused to oscillate, the stud-pins $h'$, thereon engage the levers J, and move them and the arms $j$ and $j'$, as shown by broken lines in Fig. 3, which causes the bar $J^2$, to pull the upper ends of the uprights $N^2$, and the platen roll P, mounted therebetween, forward into contact with types on the segments $d$, $d'$ and $d'$, for the purpose of printing and at the same time the arm $j'$, pushes the bar $j^3$, backward far enough to engage another tooth on the ratchet wheel $p$. Now, when the disks H', are returned backward to their normal position, the stud-pins $h^2$, secured therein will engage the under edges of the levers J, and move it and the arms $j$ and $j'$, back into the position thereof shown in full lines in Fig. 3, which action will move the platen roll P, away from the types, and by drawing forward on the bar $j^3$, cause the platen P, to turn up a new space on the ribbon of paper $Q^2$.

Supported upon a suitable spindle Q, between the uprights $N^2$, and below the platen roller P, there is a spool of paper Q', from which the paper ribbon $Q^2$, extends around between the roller P, and the type bearing segments $d$, $d'$, and $d^2$, and I also provide small spring pressed rollers $q$ $q$, to press the paper against the platen roller P. I also provide spring pressed ink bearing rollers R R, which are adapted to contact with and ink the types on the segments $d$, $d'$ and $d^2$, when they are caused to oscillate as hereinafter described. Across the front faces of the ratchet-wheels B, B' and $B^2$, there is a releasing bar S, which is provided with cam-surfaces S', (see Fig. 2) and with vertical slots $S^2$, (see Fig. 6) through which the arms E, on the disks D, may pass after being forced into their normal position parallel with the plane of the disk D, by the cam-surfaces S', as hereinafter described.

It will be noticed from Figs. 3 and 4, that the printing-roll P, is on a horizontal plane with the lowermost points of the cam-surfaces S' on the releasing-bar S, and the axis of the hollow shaft A', which is its normal position when printing the items. Behind the segments $d$, $d'$ and $d^2$, there is provided a pressure supporting bar T, which is supported at each end upon the end frames of the machine, and operates to limit the downward return movement of segments after a printing operation.

In operation, when it is desired to add say 212 and 120, the keys 2, in the hundred column, 1 in the tens column, and 2 in the unit column, are pressed inward, and the beveled inner ends of their posts $h$, acting upon the beveled outer ends of the hinged arms E, corresponding to the numerals 2, 1, 2, will cause each of said arms E, to swing laterally toward each ratchet wheel $B^2$, B' and B, as indicated by broken lines in Fig. 9, so that an arm E, numbered 2, adjacent to the ratchet-wheel $B^2$, 1, adjacent to the ratchet-wheel B', and 2, adjacent to the ratchet-wheel B, will overhang the periphery of their supporting disks D. The handle $J^2$, is then operated to cause the disks H' H', to oscillate toward the front of the machine, substantially a quarter of a revolution, which carry with them the cross-bar $H^2$, to which the arms $C^2$, on the disks C, are secured. This causes the arms C', on said disk C, to travel a quarter of a revolution toward the front of the machine, contacting with and carrying with said arms C', the hinged arms E, representing said numerals 2, 1, 2, which have been forced over into the path of said arms C', along therewith, and also likewise cause the segments $d$, $d'$ and $d^2$, to travel upward sufficiently to present the item printing types 2, 1, 2, on the printing line in front of the platen roller $p$. When the said item printing-type are in printing position, the cam surfaces S', on the releasing-bar S, will have returned the 2, 1, 2, arms E, back to their normal position, and the stud-pins $h'$, on the disks H' H', will have engaged the upper sides of the levers J, and moved them downward into the positions thereof shown in broken lines in Figs. 3 and 4, which will, through the extension $j$, pull the platen roller P, and the paper thereon, into printing contact with the types 2, 1, 2, on the respective segments $d^2$, $d'$, $d$, and at the same time the extension $j'$, moves the ratchet-bar $j^3$, backward to engage the next backward tooth on the ratchet wheel $p$. The handle $J^2$, is then returned to its normal position, which causes the cross-bar $H^2$, to engage the arms $D'$, on the disks D, and return the swinging arms E, and the printing segments, again to their normal position, the stud-pins $h^2$, on the disks H', engaging the under surfaces of the levers J, and through the bars $J^2$ and $j^3$, moving the platen roller P, away from the printing segments and causing said roller to move the paper thereon upward one space. When the printing segments are moved as above described, the dogs $f'$, on the arms $D'$, on the disks D, will cause the ratchet-wheels $B^2$, $B'$, and B, to be revolved 2, 1, 2, notches or teeth respectively, so that the points $e\ e\ e$, on the plates $E'$, which revolve in unison with their associated ratchet-wheels will stand opposite 2nd 1st and 2nd hinged arms E, as indicated in Fig. 13. The return of the operating handle $J^3$, to its normal position, clears the machine for the next item. Keys 1, 2, 0, in each of the three columns are now pressed, which cause their respective arms E, (1, 2, 0) to swing as before described, and the operating handle is again caused to travel its quarter circle, which raises the segments $d^2$, $d'$ and $d$, so that numerals 1, 2, 0, will be presented under the preceding item, and through said dogs $f'$, moves the ratchet wheels $B^2$, one tooth; $B'$, two teeth; and B, nothing, which also causes the points $e\ e\ e$, on their associated plates $E'$, to be opposite the 7th hinged arm E, in the hundreds, the 7th hinged arm in the tens, and the 8th in the units columns.

Now, to print the totals of the items added, the lever $M'$, is operated a quarter turn toward the front of the machine, which turns the rock-shaft M, as shown by broken lines in Fig. 4, so that the hooked arm $g'$, cannot pass through the transverse slots $m$, $m$, therein, so that the carrying levers G G', when released by the latch levers L L' cannot be operated by the springs $L^3$ $L^3$, and at the same time the ratchet-bar $m'$, is operated by the rock-shaft M, to cause the ratchet wheel $M^3$, to move the plates $E'$, toward the hinged arms E, when the points $e\ e\ e$, being opposite the 7th arm E, in the hundreds column, and the 7th arm E, in the tens column, and the 8th arm E, in the units column, will push said arms over into the position thereof shown by broken lines in Fig. 9, said plates $E'$, instantly returning to their normal positions shown by full lines in all of the drawings, when the points of the cam teeth $M^3$, and $m^3$, pass each other. The lever $M'$, is held down until the operating handle $J^2$, is drawn forward, which gathers the said two 7th and 8th arms into line, and presents type representing two numerals 7, and an 8, on the normal item printing line. But the drawing forward of the lever $M'$, has through the bar $n$, and crank-lever $N'$, rotated the rock-shaft N, and through the cranks $n'$, has lowered the printing apparatus so that the platen roller P, will be opposite the black type representing the numerals 332, which in Fig. 15, are shown to be immediately under the said two 7's and 8. This printing of the total at the same time causing the wheels $B^2$, $B'$ and B, to each complete a movement of ten notches, and bringing another set of points $e\ e\ e$, on the plates $E$, to the zero position as shown by full lines in Fig. 8, and the machine will be cleared for the next addition from the tens to the hundreds.

In the foregoing addition described, none of the ratchet wheels were moved ten teeth, excepting in printing the total. Should ratchet wheel B, be moved ten notches, the point $e$, on its associated plate $E'$, will be likewise turned until it is in a horizontal instead of a vertical position and the stud-pin $k'$, thereon will have engaged the inclined surface $k$, on the lever $K'$, and force said lever back to permit said stud-pin $k'$, to pass. This causes the latch-lever L, to release the carrying lever G, so that the spring $L^3$, can draw said carrying lever backward so that the dog $G^2$, (see Fig. 8) will engage the next backward tooth, when the next operation of the disks H', H', will, through the stud-pins $h'$, cause the lever J, and cross-bar $J'$, to move said carrying lever G, back to its normal position carrying with it ratchet wheel $B'$, and plate $E'$, forward one notch, and the same is true with regard to ratchet wheel $B^2$, and its plate $E'$. When printing a total it is therefore necessary to lock the carrying levers G and $G'$, by the rock-shaft M, as hereinbefore described. When, however, a transfer is to be made by reason of a transfer, the lever $K^4$, will be engaged and operated by one of the stud-pins $k'$ and thereby the releasing of the first transfer lever will be bridged over, and the second transfer lever will also be released so that all the accumulators will move that should move, as hereinbefore described.

The transfer operations hereinbefore described, all take place after the radial arms E, have been returned to their normal position and the printing segments are at rest, and during the operation of printing.

Having thus fully described the construc- tion and operation of my invention so as to enable others to construct and utilize the same, what I claim as new and desire to secure by Letters-Patent, is:

1. The combination in an adding machine, of a shaft, a disk mounted on said shaft, printing type supported by said disk, laterally moving radial arms pivoted on the opposite side of said disk in radial alinement with said printing type and normally arranged on a plane parallel with the plane of said disk, selective means to shift any one of said swinging arms out of its normal plane, an oscillatory arm mounted on said shaft beside said disk adapted to engage one of said arms so shifted out of its normal plane and cause it and said disk and printing type to oscillate on said shaft, a releasing-bar, cam-surfaces thereon adapted to release said radial arms on said disk from engagement with said oscillating arm, and move said radial arm back into its normal plane parallel with said disk, thereby stopping the forward rotation of said disk with the printing type supported thereon in the desired printing position, a rotary accumulator mounted on said shaft, and means supported on said disk and engaging said accumulator to cause it to rotate forward in unison with said disk and permit it to remain at rest during the backward movement of said disk, substantially as set forth.

2. The combination in an adding machine, of a shaft, a disk mounted thereon, radial laterally swinging arms hinged on said disk normally parallel with the plane of said disk, a series of printing type supported on the opposite side of said disk, each of said type being in radial alinement with and corresponding with one of said radial swinging arms, key mechanism adapted to move each of said radial arms out of its normal plane, an oscillatory arm mounted on said shaft adapted to engage one of said hinged arms when the same has been moved out of its normal plane and thereby cause said disk and printing type to rotate forward, a releasing bar, a cam-surface thereon adapted to engage said hinged arms when its corresponding printing type has reached the desired position and release said radial arms from engagement with said oscillatory arm, and thereby limit the forward movement of said disk and type, a rotary accumulator mounted on said shaft, and mechanism supported upon said disk and engaging said accumulator to cause it to rotate forward in unison with said disk and permit it to remain at rest during the backward movement of said disk, and manually operated mechanism to cause said oscillatory arm to rock forward and backward, substantially as set forth.

3. The combination in an adding machine, of a shaft, a disk mounted thereon, a type bearing-bar operated by said disk, printing type arranged on said bar from 1 to 9, and from 9 to 1, alternately, radial laterally movable arms mounted on said disk corresponding radially and in number with each pair of said type, selective key mechanism whereby the desired radial arm may be moved out of its normal plane, an oscillatory arm mounted on said shaft beside said disk adapted to engage a radial arm when the same has been moved out of its normal plane and thereby cause said disk and printing type to rock forward on said shaft, a releasing-bar, cam-surfaces thereon adapted to engage and move said radial arm back to its normal plane and thereby limit the forward movement of said printing type at the desired position, a rotary accumulator mounted on said shaft beside said oscillatory arm, mechanism on said disk to cause said accumulator to rotate forward in unison with said disk and permit said accumulator to remain at rest when said disk rotates backward, and manually operated mechanism mounted on said shaft adapted to give forward and backward oscillations to said oscillatory arm, substantially as set forth.

4. The combination in an adding machine, of a shaft, a plurality of disks mounted on said shaft, a type-bar for and operated by each of said disks, printing type on each of said bars, a series of radially hinged arms on each of said disks in radial alinement with said type, means to move the desired radial arms out of their normal plane, an oscillatory arm mounted on said shaft beside each of said disks adapted to engage any radial arm which has been moved out of its normal plane, a releasing bar, cam-surfaces thereon adapted to engage and move said radial arms out of engagement with said oscillatory arms, and thereby limit the forward movement of said printing type, a toothed accumulator mounted upon said shaft beside each of said disks, means on each of said disks adapted to engage its associated accumulator and cause it to move forward in unison with said disk, and manually operated mechanism common to all of said disks to cause said oscillatory arms to rock forward on said shaft, and to engage and cause all of said disks to return to their initial position.

5. In an adding machine comprising substantially an accumulator having ratchet teeth, an oscillatory type-bearing member having a dog engaging said ratchet teeth, and means for oscillating said type-bearing member, of a plate rotating in unison with said accumulator and adapted to control said type-bearing member to present the desired total printing type, means to operate said plate, and impression mechanism adapted to co-act with said total printing type, substantially as set forth.

6. In an adding machine comprising substantially an accumulator having ratchet teeth, an oscillatory type-bearing member having a dog engaging said ratchet teeth, and means for oscillating said type-bearing member, of radially movable arms on said type-bearing member, a spring-pressed laterally movable plate mounted upon a common axis with said accumulator and rotating in unison therewith and adapted to be moved laterally to cause one of said radial arms to be moved so as to control said type-bearing member to present the desired total printing type, and impression mechanism to co-act with the total printing type presented, substantially as set forth.

7. In an adding machine the combination of an oscillatory type-bearing member, key actuated arms on said member, a guide member adapted to move said arms into a plane parallel with said type-bearing member when said arms have moved a predetermined distance, means adapted to oscillate said type-bearing member, a rotary accumulator, mechanism on said type-bearing member adapted to rotate said accumulator forward in unison with said type-bearing member, impression mechanism adapted to co-act with said type-bearing member to print items and totals, a laterally movable member revolving in unison with said accumulator adapted to control said type-bearing member to present proper type to said impression mechanism for printing totals, and means to move said member laterally, substantially as set forth.

8. In an adding machine, a rotary accumulator, a hub thereon, an oscillatory type-bearing member mounted on said hub, key actuated radial hinged arms on said type-bearing member, a guide member adapted to guide said arms into a plane parallel with the plane of said type-bearing member, means mounted on said hub adapted to contact with one of said radial arms and oscillate said type-bearing member, mechanism on said type-bearing member to rotate said accumulator forward in unison therewith, indicator mechanism slidably mounted on said hub and rotatable in unison with said accumulator adapted to control said type bearing member to present proper type for printing totals, means to move said indicator mechanism toward and from said accumulator, and impression mechanism adapted to co-act with said type-bearing member to print items and totals, substantially as set forth.

9. In an adding machine, a rotary accumulator, a hub thereon, an oscillatory type-bearing member mounted on said hub, mechanism on said type-bearing member to cause said accumulator to rotate forward in unison therewith, hinged radial arms on said type-bearing member, key-mechanism adapted to force the outer ends of said arms toward said accumulator, an oscillating member mounted on said hub, an arm thereon adapted to engage one of said radial arms when the same is forced toward said accumulator and carry said arm and type-bearing member forward a partial revolution, guide mechanism adapted to move said radial arms back into their normal plane at a predetermined point in their forward movement, an indicator plate slidably mounted on said hub and rotatable in unison with said accumulator, a point on said plate adapted to engage one of said radial arms, mechanism adapted to move said plate toward and away from said accumulator, and impression mechanism adapted to co-act with said printing member to print items and totals, substantially as set forth.

10. In an adding machine the combination of a hollow shaft having slots in the walls thereof, an accumulator positioned thereon, a hub on said accumulator, an oscillatory type-bearing member mounted on said hub, mechanism on said type-bearing member adapted to cause said accumulator to move forward in unison with said type-bearing member, hinged radial arms on said type-bearing member, selective mechanism adapted to move the desired radial arm out of the plane of its fellows toward said accumulator, an oscillatory member mounted on said hub, an arm on said member to engage such radial arm and thereby oscillate said type-bearing member, means to operate said oscillatory member, a guide member to engage said radial arm and move it back into the plane of its fellows at a predetermined point in its forward reciprocation and thereby release it from engagement with the arm on said oscillatory member, item printing types on said type-bearing member on radial lines corresponding to the radial lines of said hinged arms from 1 to 9, inclusive from top to bottom, total printing types alternating with said item printing types from 1 to 9, inclusive, from the bottom to the top, an indicator plate slidably mounted on said hub and rotatable in unison with said accumulator, a point thereon adapted to engage one of said radial arms, a slidable rod within said hollow shaft and means secured thereto for moving said plate toward said accumulator, and an impression mechanism adapted to co-act with said item, and total printing type to print items or totals as desired, substantially as described.

11. In an adding machine the combination of an accumulator provided with teeth arranged in multiples of ten, an oscillatory member, laterally movable radial arms and a type-bearing segment supported on said oscillatory member, keys adapted to move said laterally movable radial arms out of their normal plane, a spring pressed dog on said oscillatory member engaging the teeth on said accumulator, means to engage said laterally moved radial arms and oscillate the type-bearing segment and revolve the accumulator a predetermined distance, releasing mechanism adapted to disengage said radial arms from their oscillating mechanism, and means to return said oscillatory member to its normal position, substantially as described.

12. In an adding machine the combination of an accumulator provided with teeth arranged in multiples of ten, an oscillatory member, laterally movable radial arms and a type-bearing segment supported on said member, key mechanism adapted to move each of said radial laterally as desired, mechanism adapted to engage said radial arms when moved laterally and operate said type-bearing segment until a desired type thereon is brought to the printing point, a spring-pressed dog on said oscillatory member engaging the teeth on said accumulator, a laterally movable plate, extensions thereon opposite each tenth tooth on said accumulator adapted to rotate in unison with said accumulator, means to move said plate laterally to cause one of the extensions thereon to engage one of said radial arms and move it laterally toward said accumulator, releasing means to disengage said laterally moved radial arm from its operating mechanism, and impression mechanism adapted to co-act with said segment to print items and totals, substantially as set forth.

13. In an adding machine the combination of a series of accumulators, an oscillatory member adjacent to each accumulator, laterally movable radial arms and type-bearing segments supported on said members, means adapted to engage said radial arms, key mechanism adapted to move said radial arms, oscillatory mechanism adapted to engage said radial arms when moved out of their normal plane, releasing means adapted to move said arms back into their normal plane, a series of laterally movable plates adjacent to said oscillatory member rotatable in unison with said accumulators, extensions on said plates adapted to engage said radial arms, means to move said plates laterally, lever and dog transfer mechanism adapted to be actuated by said laterally movable plates to rotate the tens and succeeding accumulators forward one notch when ten units have been registered on each of said accumulators, lever mechanism adapted to be actuated by the laterally movable plate associated with the tens and succeeding accumulators when nine digits have been accumulated thereon to operate the transfer lever and dog mechanism associated with the hundreds and succeeding accumulators when nine digits have been accumulated thereon simultaneously with the operation of the transfer mechanism associated with the tens accumulators, and impression mechanism adapted to co-act with said segments to print items and totals substantially as described.

14. In an adding machine the combination of a series of accumulators, ratchet teeth thereon arranged in multiples of ten, spring actuated carrying levers, dog mechanism on said levers engaging the teeth on the tens and hundreds accumulators, latch lever mechanism to maintain said carrying levers in a normally forward position, means to unlatch said carrying levers and permit a sufficient backward movement thereof to permit said dog to engage the next backward tooth on its accumulator when ten units have been registered on the preceding accumulator, means to release the hundreds latch-lever mechanism simultaneously with the release of the tens latch-lever mechanism when nine digits have been accumulated on the tens accumulator, and lever mechanism adapted to move said carrying levers forward to their normal position, substantially as set forth.

15. In an adding machine, a non-rotatable shaft, a series of accumulators rotatably mounted thereon, an oscillatory member adjacent to each of said accumulators, radial laterally movable arms and type-bearing segments on said members, means to oscillate said oscillatory member, means on said members to rotate said accumulators forward in unison with said members, carrying mechanism actuated by said accumulators to register one unit on the succeeding accumulator when ten units have been registered on the preceding accumulator, mechanism to lock said carrying mechanism, and impression mechanism adapted to co-act with said segments to print items and totals, substantially as described.

16. In an adding machine the combination of a series of accumulators, an oscillatory member adjacent to each accumulator, means thereon to rotate each accumulator in unison with its associated oscillatory member, radial laterally movable arms, and type-bearing segments supported by each oscillatory member, mechanism common to the entire series for oscillating said members, mechanism adapted to limit the forward oscillation of said members, carrying mechanism in operative relation to each of the accumulators succeeding the units, mechanism actuated by each accumulator to control said carrying mechanism, mechanism adapted to actuate said carrying mechanism to rotate its associated accumulator forward one notch, mechanism adapted to be actuated by the tens accumulator when nine digits have been accumulated thereon to operate the carrying mechanism associated with the hundreds accumulator, and impression mechanism adapted to co-act with said segments to print items and totals, substantially as described.

17. In an adding machine, the combination of type-bearing segments, item printing type thereon in consecutive sequence from top to bottom thereof, total printing type thereon in consecutive sequence from the bottom to the top thereof between each of said item printing type, an impression platen adapted to co-act with either set of said type to print totals and items, and mechanism adapted to position said platen to print the item or total as desired, substantially as set forth.

18. In an adding machine the combination of type-bearing segments, item printing type thereon in consecutive sequence from top to bottom thereof, total printing type thereon in consecutive sequence from bottom to top between each of said item printing type, an impression platen normally in position to co-act with said item printing type to print totals, means actuated by some movable part of the machine to cause said platen to so co-act, mechanism adapted to move said platen into position to co-act with said total printing type, and means connected with some movable part of the machine to actuate said platen positioning mechanism, substantially as described.

In testimony whereof I affix my signature, in presence of two witnesses.

ABRAHAM SMITH.

Witnesses:
H. M. STURGEON,
EDWARD E. ALLEN.